US012802906B2

(12) United States Patent
Chen et al.

(10) Patent No.: US 12,802,906 B2
(45) Date of Patent: Nov. 17, 2026

(54) TOUCH LIGHTING KEYSWITCH AND TOUCH LIGHTING FUNCTION KEY BAR

(71) Applicant: DARFON ELECTRONICS CORP., Taoyuan City (TW)

(72) Inventors: Chao-Yu Chen, Taoyuan City (TW); Hsin-Cheng Ho, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 275 days.

(21) Appl. No.: 18/746,069

(22) Filed: Jun. 18, 2024

(65) Prior Publication Data

US 2024/0429005 A1 Dec. 26, 2024

(30) Foreign Application Priority Data

Jun. 20, 2023 (TW) ................................ 112123193
Dec. 22, 2023 (TW) ................................ 112150254

(51) Int. Cl.
*H01H 13/83* (2006.01)
*G06F 3/02* (2006.01)

(52) U.S. Cl.
CPC ........... *H01H 13/83* (2013.01); *G06F 3/0202* (2013.01); *H01H 2219/06* (2013.01); *H01H 2219/062* (2013.01); *H01H 2219/064* (2013.01)

(58) Field of Classification Search
CPC ............... H01H 13/83; H01H 2219/06; H01H 2219/062; H01H 2219/064; H01H 2217/032; H01H 2219/036; H01H 2219/054; H01H 2219/058; H01H 2239/006; H01H 2239/074; H01H 9/16; H01H 9/161; H01H 9/167; H01H 9/18; H01H 9/181; H01H 9/182; H01H 200/00; H01H 200/0293; H01H 2009/16; H01H 2009/161; H01H 2009/164;
(Continued)

(56) References Cited

U.S. PATENT DOCUMENTS

2019/0027326 A1 1/2019 Tsai
2021/0063632 A1 3/2021 Ho

FOREIGN PATENT DOCUMENTS

CN 101847537 A 9/2010
TW 201314513 A1 4/2013
(Continued)

*Primary Examiner* — Anthony R Jimenez
(74) *Attorney, Agent, or Firm* — Winston Hsu

(57) ABSTRACT

A touch lighting keyswitch can be changed to a touch lighting function key bar includes a circuit board, a first sheltering component, a first light guiding component, a second sheltering component and a second light guiding component. The circuit board has a first light unit and a second light unit respectively emitting a first illumination beam and a second illumination beam. The first sheltering component has a character hole. The first light guiding component is disposed between the circuit board and the first sheltering component and adapted to guide the first illumination beam passing through the character hole. The second sheltering component is disposed above the first sheltering component, and has an opening relevant to the character hole. The second light guiding component is disposed between the first sheltering component and the second sheltering component and adapted to guide the second illumination beam passing through the opening.

20 Claims, 14 Drawing Sheets

(58) Field of Classification Search
CPC ........ H01H 2009/18; H01H 3/00; H01H 3/12; G06F 3/02; G06F 3/0202
USPC .......................................................... 200/313
See application file for complete search history.

(56) References Cited

FOREIGN PATENT DOCUMENTS

| | | | | |
|---|---|---|---|---|
| TW | I666672 | B | * | 7/2019 |
| TW | 202004807 | A | | 1/2020 |
| TW | I755674 | | | 2/2022 |
| TW | M640905 | | | 5/2023 |

* cited by examiner

TOUCH LIGHTING KEYSWITCH AND TOUCH LIGHTING FUNCTION KEY BAR

BACKGROUND OF THE INVENTION

1. Field of the Invention

The present invention relates to a touch lighting keyswitch and a touch lighting function key bar, and more particularly, to a touch lighting keyswitch with advantages of preferred light isolation and easy assembly and a related touch lighting function key bar.

2. Description of the Prior Art

With the advanced technology, the computer apparatus may have the illuminated touch module including several operation buttons to set as the input interface. The illuminated touch module includes the set of buttons, the light guide unit and the light emitting unit with corresponding numbers. The light guide unit is disposed above the set of buttons, and the light emitting unit is disposed adjacent to the light guide unit to provide edge-lit illumination. The light guide units have small volume and are spaced from each other, and are respectively disposed on the set of buttons. The light guide unit has to align with the corresponding light emitting unit, and is spaced from the adjacent light guide unit by a preset distance, which results in difficult assembly. Even if the light guide units are monolithically integrated with each other, the adjacent light guide units in conventional design still cannot effectively prevent the light leakage; which means illumination light emitted by the actuated operation button may be leaked to the adjacent operation button that is not actuated, and the conventional illuminated touch module cannot provide preferred user experience. Therefore, design of a light guide plate that does not leak light and is easy to assemble and apply for the operation buttons arranged in the strip is an important issue in the related mechanical design industry.

SUMMARY OF THE INVENTION

The present invention provides a touch lighting keyswitch with advantages of preferred light isolation and easy assembly and a related touch lighting function key bar for solving above drawbacks.

According to the claimed invention, a touch lighting keyswitch includes a circuit board, a first sheltering component, a first light guiding component, a second sheltering component and a second light guiding component. A first light unit and a second light unit are disposed on the circuit board. The first light unit emits a first illumination beam, the second light unit emits a second illumination beam having color different from color of the first illumination beam. The first sheltering component has a character hole. The first light guiding component is disposed between the circuit board and the first sheltering component, and adapted to guide the first illumination beam passing through the character hole. The second sheltering component is disposed above the first sheltering component, and has an opening relevant to the character hole. The second light guiding component is disposed between the second sheltering component and the first sheltering component, and adapted to guide the second illumination beam transmitting towards the opening when the first illumination beam passes through the character hole and the opening.

According to the claimed invention, a touch lighting function key bar includes a circuit board, a first sheltering component, a second sheltering component and a light guide assembly. At least two first light units and at least two second light units are disposed on the circuit board. Each of the first light units emits a first illumination beam. Each of the second light units emits a second illumination beam having color different from color of the first illumination beam. One first light unit of the first light units is paired with a corresponding second light unit of the second light units. The first sheltering component has at least two character holes. The second sheltering component is disposed above the first sheltering component, and has at least two openings relevant to the character holes. The light guide assembly includes a first light guide body and a second light guide body. The first light guide body includes a first lower light guide unit and a first upper light guide unit. The first lower light guide unit is disposed between the first sheltering component and the circuit board and adapted to guide the first illumination beam emitted by the one first light unit passing through one of the character holes. The first upper light guide unit is disposed between the second sheltering component and the first sheltering component and adapted to guide the second illumination beam emitted by the corresponding second light unit passing through one of the openings when the one first light unit emits the first illumination beam. The second light guide body is disposed adjacent to and spaced from the first light guide body. The second light guide body includes a second lower light guide unit and a second upper light guide unit. The second lower light guide unit is disposed between the first sheltering component and the circuit board and adapted to guide the first illumination beam emitted by another first light unit of the first light units passing through another character hole of the character holes. The second upper light guide unit is disposed between the second sheltering component and the first sheltering component and adapted to guide the second illumination beam emitted by another second light unit of the second light units passing through another opening of the openings when the another first light unit emits the first illumination beam.

The backlight module of the present invention can design the multiple light guide plate including the light guide bodies and the bridging portions. The light guide bodies are disposed adjacent to and spaced from each other. The bridging portion can be connected between the adjacent light guide bodies so that the multiple light guide plate can be assembled easily. The light guide body can be designed as the rectangular structure, the diamond structure, the round structure or the polygonal structure. The bridging portion can be designed as the C-type structure, the S-type structure, the W-type structure, the M-type structure, or any structure with a concave and convex form. The bridging portion can include sections bent from each other, and the bridging portion can be connected to the light guide body in the bending manner. Therefore, the multiple light guide plate can dispose the roundabout bridging portion between the adjacent light guide bodies, and a width of the bridging portion can be ranged between 0.1 mm and 2 mm. The bridging portion can effectively increase the absorption and reflection times of the light beam in transmission so as to prevent the light beam from being transmitted to other light guide body, and to achieve the design demand of no light leakage. Besides, the present invention can further stack the sheltering components and the light guide plates within the touch lighting keyswitch, and dispose the light units that correspond to the numbers of the sheltering component and the light guide plate in the touch lighting keyswitch, so that the touch lighting keyswitch can provide a backlight function in the standby mode, and further can provide another illumination function different from the backlight function when being pressed and actuated, so as to generate an illumination interaction effect. Accordingly, the multiple light guide plate of the present invention can be applied to the touch lighting function key bar, and all the function keys of the touch lighting function key bar in the standby mode can provide the backlight function, and some of the function keys may be actuated to generate the illumination function different from the backlight function, which can increase design texture of the touch lighting keyswitch and the related illuminated keyboard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
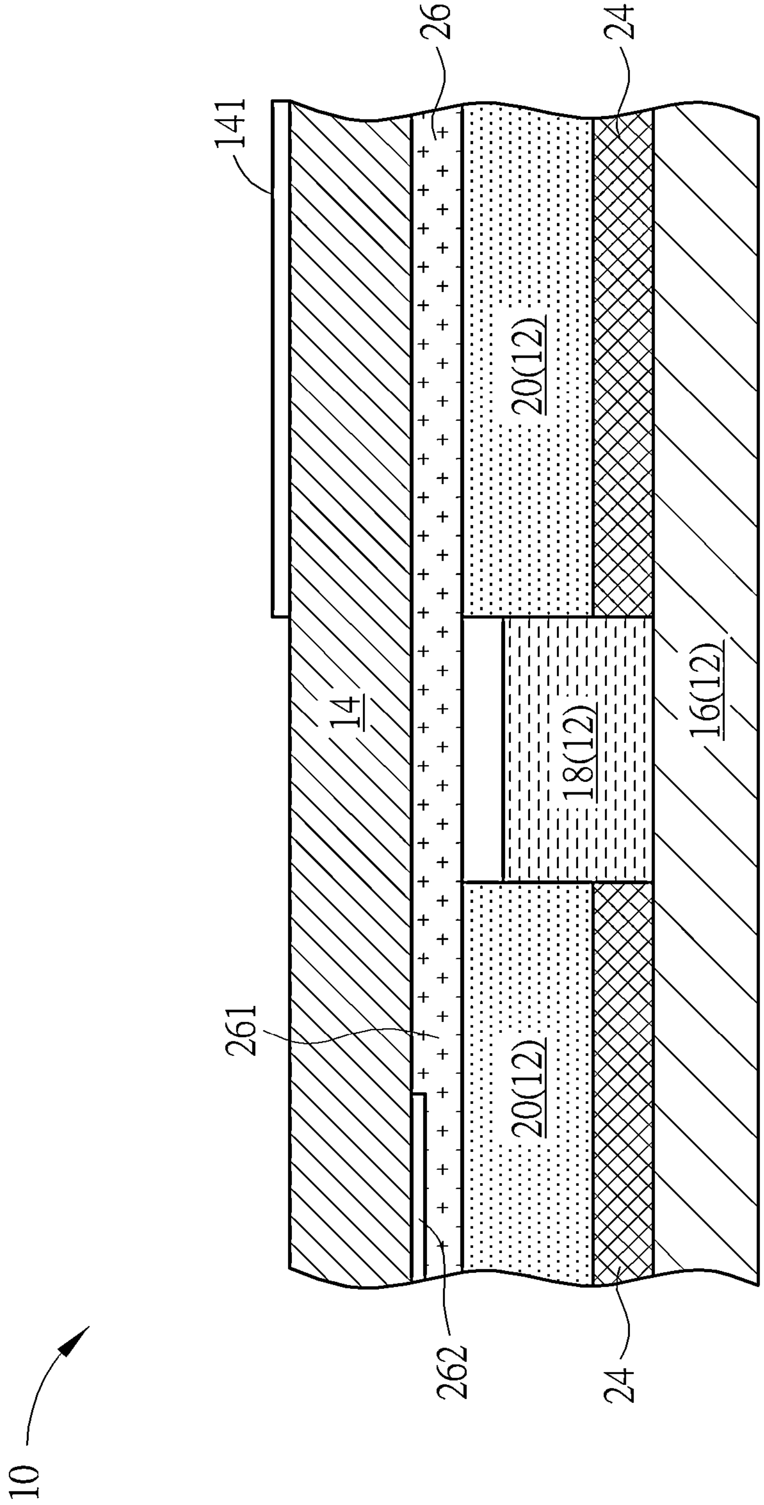
FIG. 1 is a sectional view of an input device according to an embodiment of the present invention.

Please refer to FIG. 1. FIG. 1 is a sectional view of an input device 10 according to an embodiment of the present invention. The input device 10 can be a touch pad, or a touch device with similar functions. The input device 10 can include a backlight module 12 and in input interface 14. The input interface 14 various types of touch interfaces, and a detailed description is omitted herein for simplicity. The backlight module 12 can optionally include a main board 16, a lighting component 18 and a light guide plate 20. The lighting component 18 can be disposed on the main board 16. The light guide plate 20 can be located on the lighting component 18 and provide an edge-lit backlight function. In addition, a reflection plate 24 can be optionally disposed between the light guide plate 20 and the main board 16. A shelter layer 26 can be optionally disposed between the backlight module 12 and the input interface 14. The shelter layer 26 can have a transparent area 261 and an opaque area 262. Black ink or dark ink can be printed on an upper surface or a lower surface of the transparent thin film to define as the opaque area 262. An area of the transparent thin film without the black ink and the dark ink can be defined as the transparent area 261; practical application of the transparent area 261 and the opaque area 262 is not limited to the foresaid embodiment. Configuration of the input device 10 is also not limited to the foresaid embodiment, and depends on a design demand.

The light guide plate 20 can be the multi-key or multi-button light guide, which means the multiple light guide plate 20 can be applied for several operation buttons of the input interface 14. The multiple light guide plate 20 can include several light guide bodies respectively disposed on positions corresponding to different operation buttons, and the light guide bodies can respectively align with the lighting components 18. The lighting component 18 can be a monochromic light unit or a color light unit. Besides, in order to meet design requirement of connecting the light guide bodies and preventing light interference between the adjacent operation buttons, the present invention can utilize an air gap and bridge design to apply the multiple light guide plate 20 for the backlight module 12 and the input device 10 so as to effectively isolate light leakage between the operation buttons.

Figure 2:
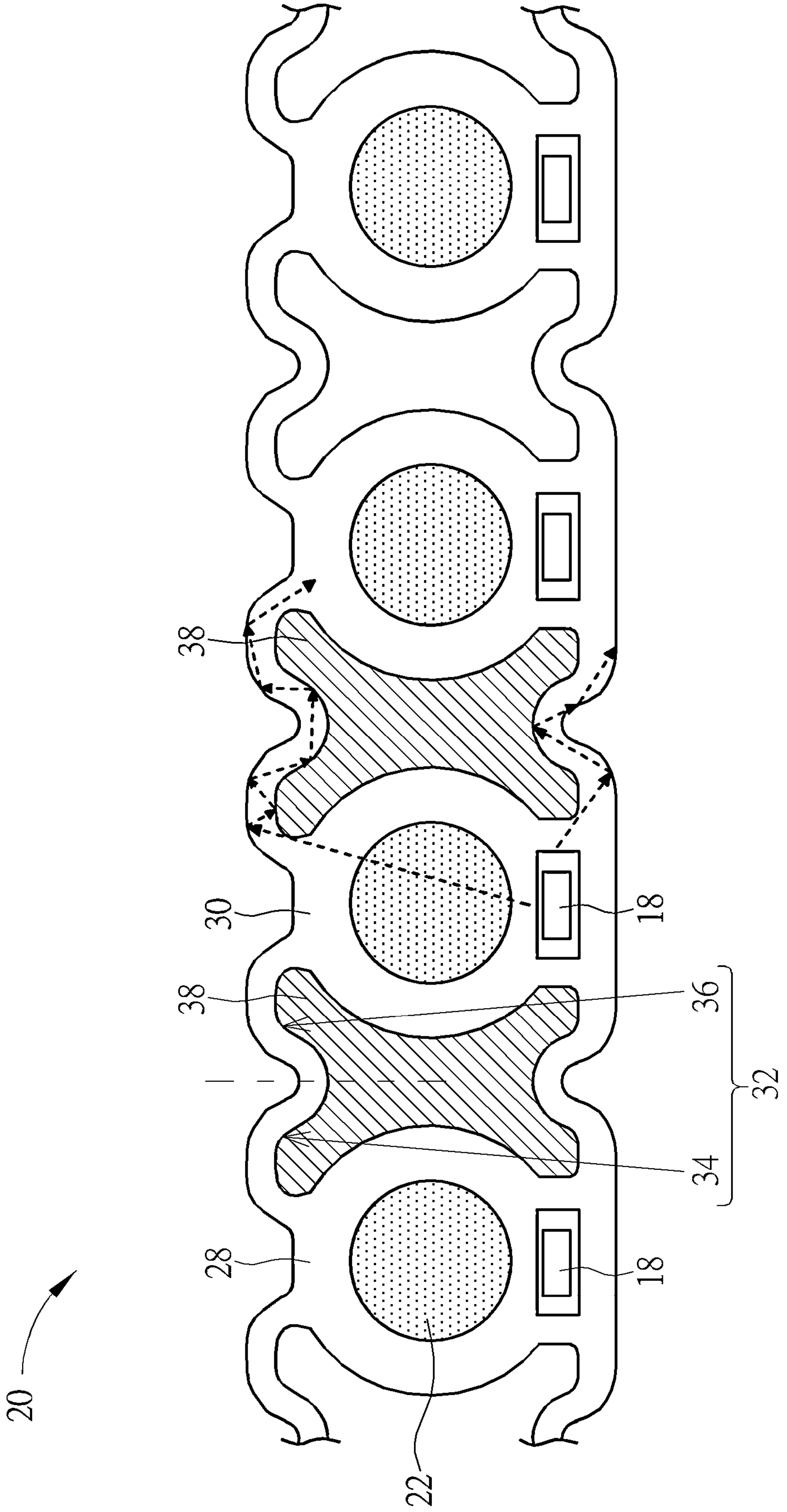
FIG. 2 is a diagram of a multiple light guide plate according to a first embodiment of the present invention.

Please refer to FIG. 2. FIG. 2 is a diagram of the multiple light guide plate 20 according to a first embodiment of the present invention. The multiple light guide plate 20 can at least include a first light guide body 28, a second light guide body 30 and a bridging portion 32. The second light guide body 30 can be disposed adjacent to and spaced from the first light guide body 28. The bridging portion 32 can be connected between the first light guide body 28 and the second light guide body 30. The multiple light guide plate 20 can optionally include a microstructure area 22 disposed on the first light guide body 28 and/or the second light guide body 30, and adapted to guide a light beam illuminating a corresponding symbol 141 on the input interface 14. The microstructure area 22 can be optionally disposed on an upper surface or a lower surface of the first light guide body 28 and/or the second light guide body 30. The microstructure area 22 may be micro prisms or white dots, which depends on an actual demand. Generally, the bridging portion 32 can be formed by material the same as material of the first light guide body 28 and the second light guide body 30 in a monolithically integrated manner, which depends on the actual demand. Numbers and positions of the light guide bodies 28 and 30 and the bridging portion 32 are not limited to the embodiment shown in the figure, and can be changed in accordance with a size of the backlight module 12 or a number of the operation buttons of the input interface 14. For example, the multiple light guide plate 20 can be made of light guide material. The present invention can decide an overall length of the multiple light guide plate 20 in accordance with property of the light guide material, so as to avoid the multiple light guide plate 20 from structural deformation due to extension of the bridging portion.

The bridging portion 32 can include a first section 34 and a second section 36 bent form each other. The first section 34 can be connected between the first light guide body 28 and the second section 36. The second section 36 can be connected between the second light guide body 30 and the first section 34. In the present invention, the bridging portion 32 connected between the first light guide body 28 and the second light guide body 30 can be designed as a bending structure, such as the C-type structure or the semicircular structure; as shown in FIG. 2, the foresaid structure can be used to increase absorption and reflection times of the light beam inside the bridging portion 32, so as to prevent the light beam emitted by the lighting component 18 and entering the first light guide body 28 from being guided into the second light guide body 30.

The first section 34 and the second section 36 can be the bending structures; besides, the multiple light guide plate 20 can connect the first section 34 with the first light guide body 28 in a relatively bending manner, and further connect the second section 36 with the second light guide body 30 in the relatively bending manner. Thus, connection between the first section 34 and the first light guide body 28 (or between the second section 36 and the second light guide body 30) can be an arc structure or a hook structure, and can effectively increase the absorption and reflection times of the light beam transmitted inside the first section 34 (or the second section 36), so as to prevent the light beam emitted by the lighting component 18 from being guided into the other light guide body.

Figure 3:
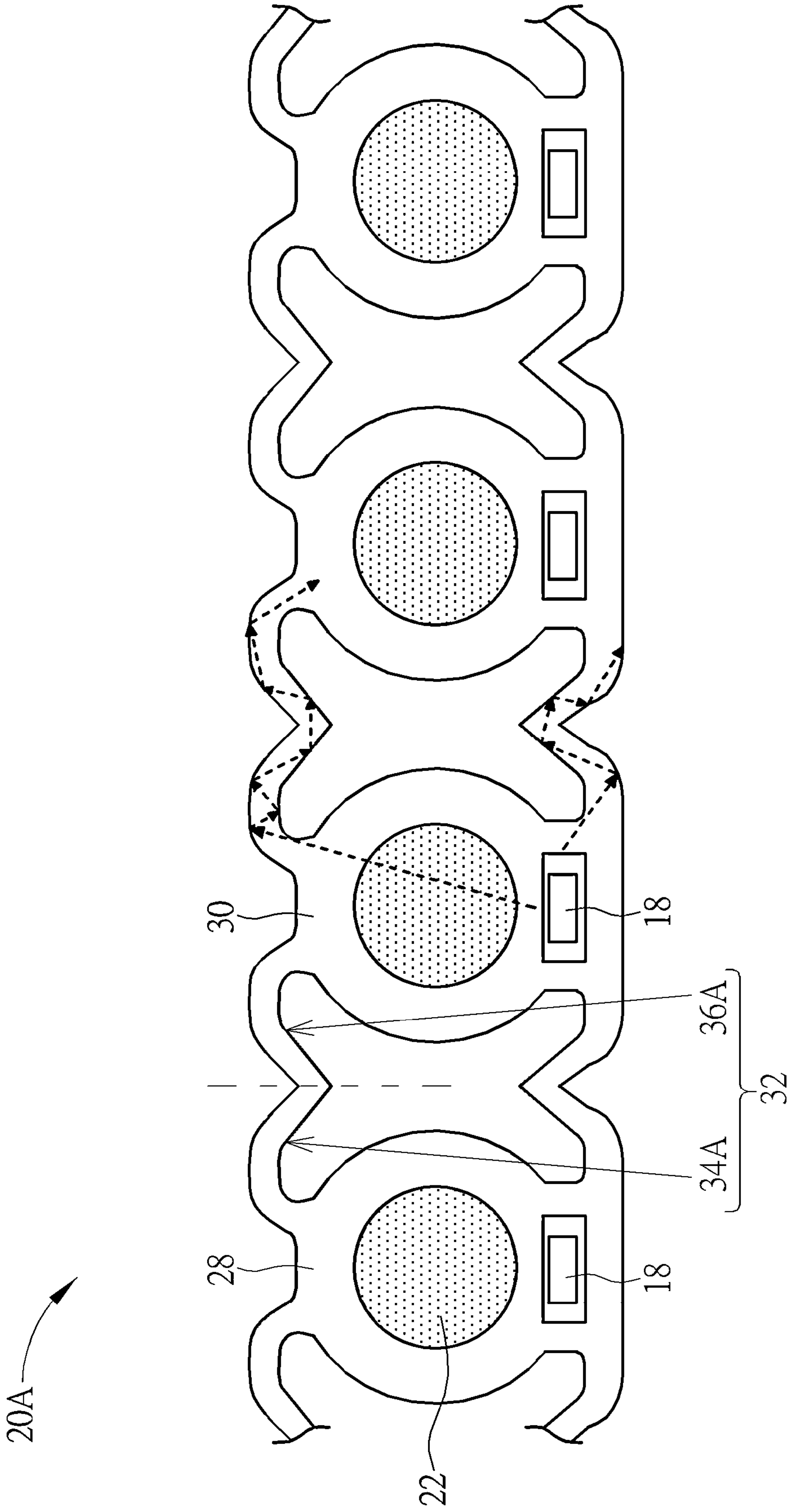
FIG. 3 is a diagram of the multiple light guide plate according to a second embodiment of the present invention.

Moreover, connection between the first section 34 and the second section 36 can be designed as the arc structure, as shown in FIG. 2, the arc structure can be used to increase the absorption and reflection times of the light beam transmitted between the first section 34 and the second section 36; however, practical application of the connection between the first section 34 and the second section 36 is not limited to the foresaid embodiment. Please refer to FIG. 3. FIG. 3 is a diagram of the multiple light guide plate 20A according to a second embodiment of the present invention. In each embodiment of the present invention, elements having the same numerals as ones of other embodiment can have the same structure and function, and the detailed description is omitted herein for simplicity. Connection between the first section 34A and the second section 36A of the multiple light guide plate 20A can be an angled structure, and used to increase the absorption and reflection times of the light beam transmitted between the first section 34A and the second section 36A.

Figure 4:
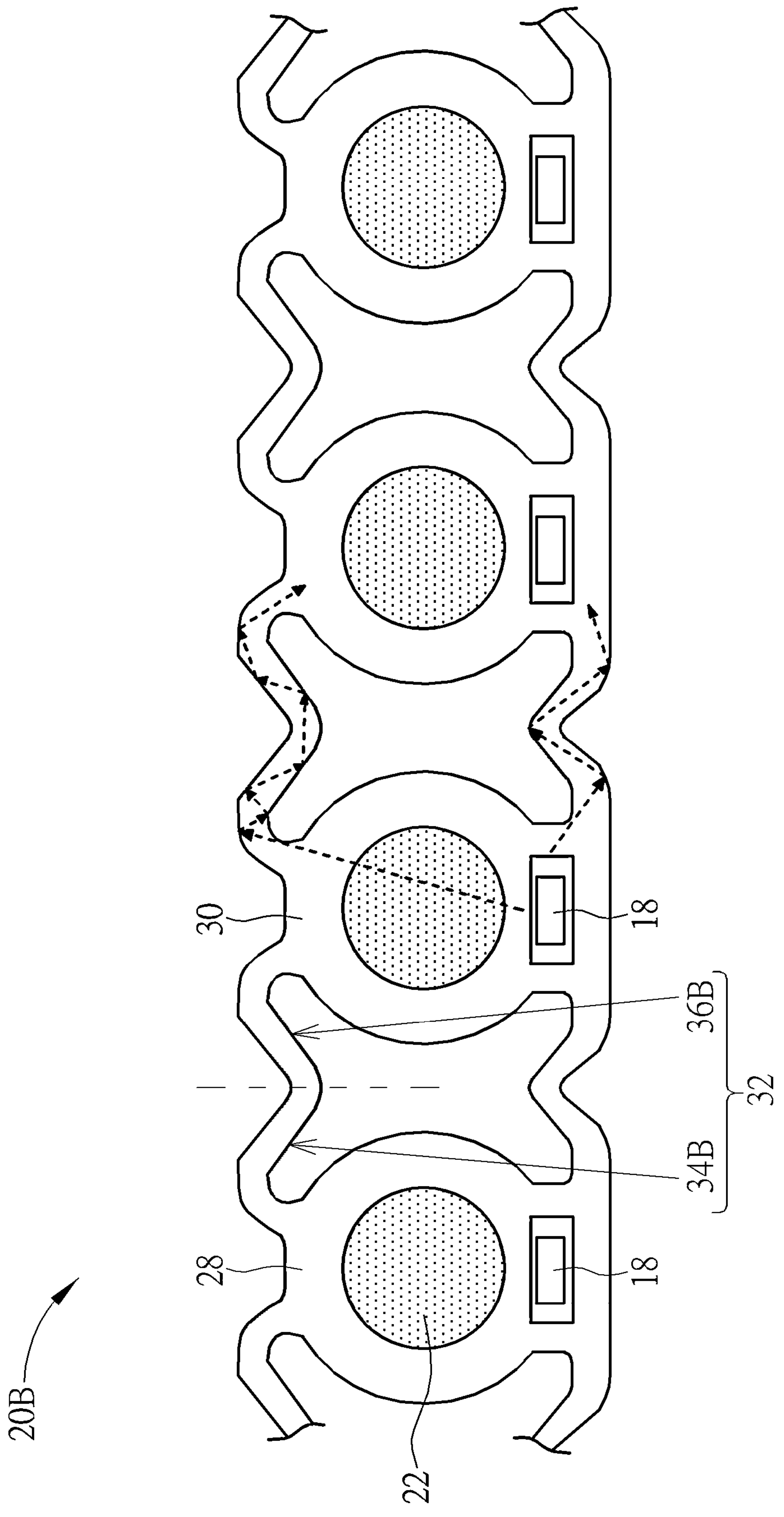
FIG. 4 is a diagram of the multiple light guide plate according to a third embodiment of the present invention.

As shown in FIG. 2 and FIG. 3, the first section 34 and the second section 36 (or the first section 34A and the second section 36A) can be bending sections and used to increase the absorption and reflection times of the light beam transmitted between the foresaid sections; practical application of the first section 34 and/or the second section 36 is not limited to the foresaid embodiment. Please refer to FIG. 4. FIG. 4 is a diagram of the multiple light guide plate 20B according to a third embodiment of the present invention. The first section 34B and the second section 36B of the multiple light guide plate 20B can be designed as straight sections. Connection between the first section 34B and the first light guide body 28, connection between the first section 34B and the second section 36B, and connection between the second section 36B and the second light guide body 30 can be designed as the arc structure or the angled structure for increasing the absorption and reflection times of the light beam transmitted between the first light guide body 28 and the second light guide body 30.

Figure 5:
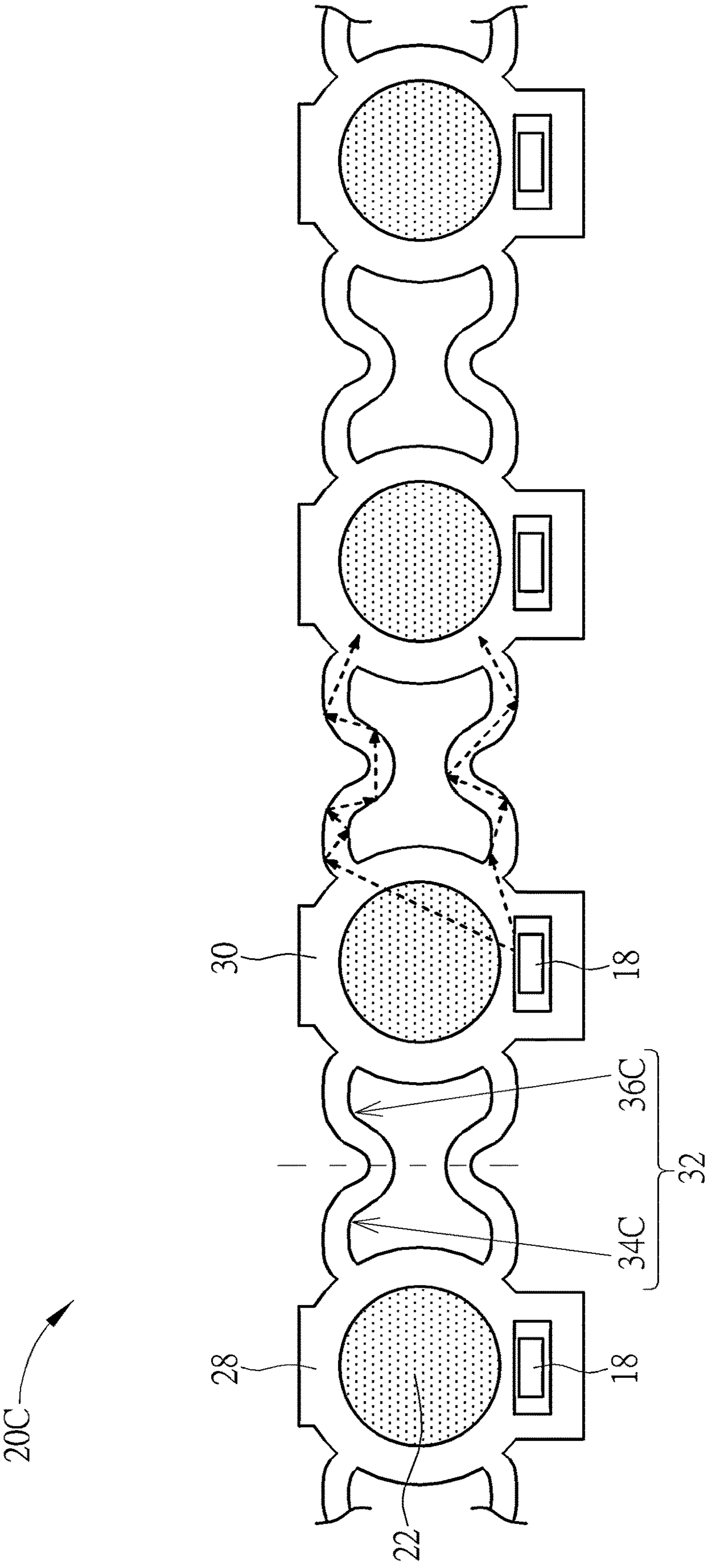
FIG. 5 is a diagram of the multiple light guide plate according to a fourth embodiment of the present invention.

Further, as shown in FIG. 2 to FIG. 4, the first section 34 and the second section 36 (or the first section 34A and the second section 36A, or the first section 34B and the second section 36B) can be located outside a gap between the first light guide body 28 and the second light guide body 30; practical application of position of the first section and the second section is not limited to the foresaid embodiment. Please refer to FIG. 5. FIG. 5 is a diagram of the multiple light guide plate 20C according to a fourth embodiment of the present invention. The first section 34C and the second section 36C of the multiple light guide plate 20C can be designed as straight sections or bending sections and connection between the first section 34C and the second section 36C can be designed as the arc structure or the angled structure. The first section 34C and the second section 36C can be respectively connected with the first light guide body 28 and the second light guide body 30 in the relatively bending manner, and extended into the gap between the first light guide body 28 and the second light guide body 30.

Please refer to FIG. 2. The multiple light guide plate 20 can further include a light absorbing component 38 disposed inside the gap between the first light guide body 28 and the second light guide body 30. The absorption and reflection times of the light beam emitted by the lighting component 18 can be increased due to a roundabout path of the bridging portion 32, so that the light beam can be blocked without entering other light guide body. The light absorbing component 38 can be further filled into the gap between the first light guide body 28 and the second light guide body 30 adjacent to each other, so as to enhance light isolation effect of the multiple light guide plate 20. Material of the light absorbing component 38 can depend on the design demand. The light absorbing component 38 may be fully filled into the gap between the first light guide body 28 and the second light guide body 30, or may partly filled into the gap between the first light guide body 28 and the second light guide body 30. Installation of the light absorbing component 38 can depend on the light isolation effect of the multiple light guide plate 20.

Figure 6:
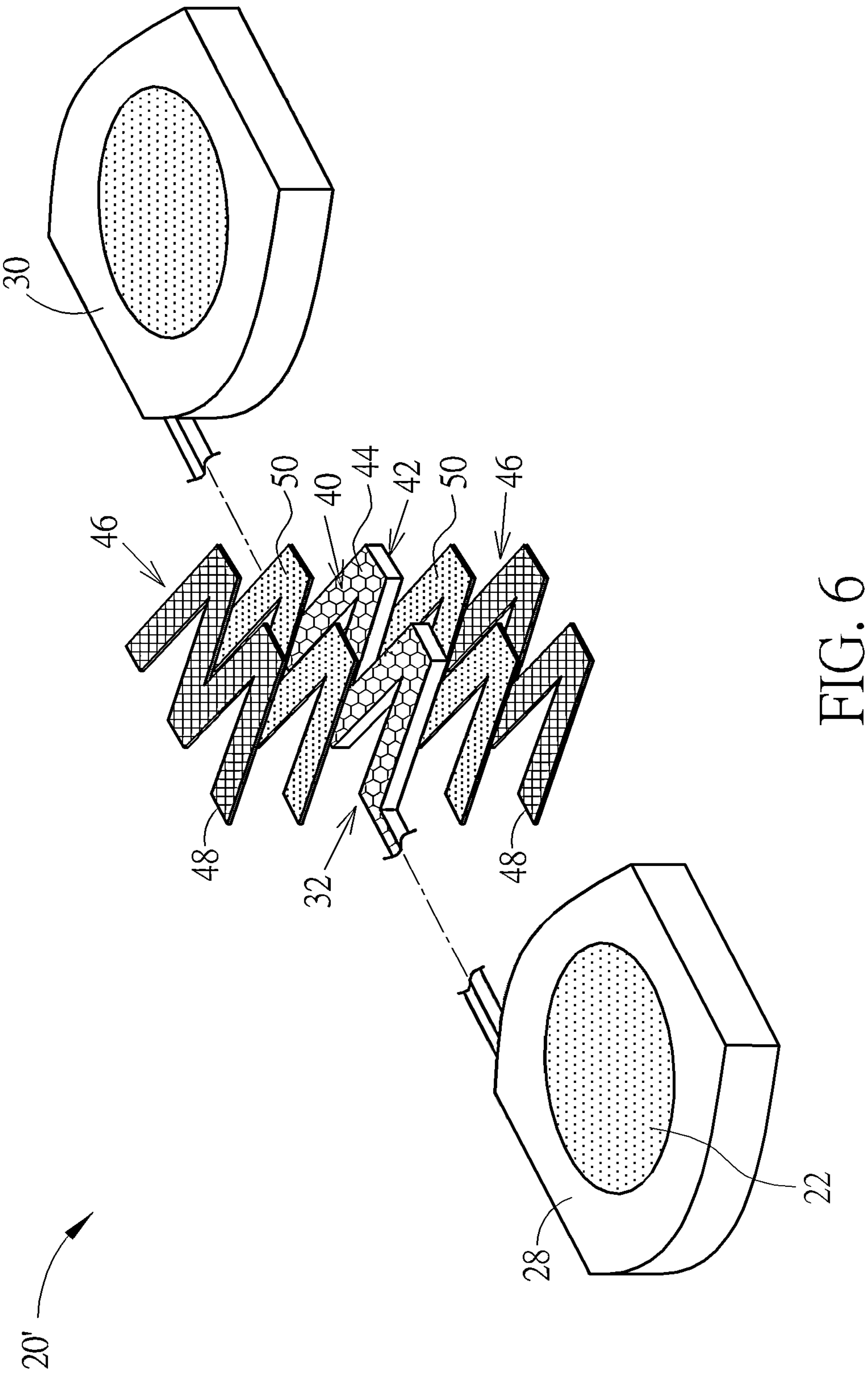
FIG. 6 is a diagram of the multiple light guide plate according to another embodiment of the present invention.

Please refer to FIG. 6. FIG. 6 is a diagram of the multiple light guide plate 20' according to another embodiment of the present invention. A shape of the bridging portion 32 in the present invention is not particularly limited, and the shape of the bridging portion 32 shown in FIG. 6 is slightly different from the shape of the foresaid embodiment. Any bridging portion that conforms to above-mentioned description can be applied for the multiple light guide plate 20'. The bridging portion 32 can include an upper surface 40 and a lower surface 42 opposite to each other. In the embodiment, a plurality of microstructures 44 of the multiple light guide plate 20' can be formed on the upper surface 40 and/or the lower surface 42, and can be used to destroy total reflection of the light beam and prevent the light beam from leakage. Accordingly, the plurality of microstructures 44 of the multiple light guide plate 20' can be optionally formed on the upper surface and the lower surface of the first light guide body 28 and/or the second light guide body 30. Material property, distribution density and pattern of the microstructures 44 are not limited to the embodiment shown in the figures.

As shown in FIG. 6, the present invention can dispose the light sheltering component 46 on the upper surface and/or the lower surface of the multiple light guide plate 20' to further improve a function of the bridging portion 32 in preventing leakage of the light beam. The light sheltering component 46 can be made of light sheltering material or light absorbing material. A light absorption layer 48 can be optionally disposed on a surface of the light sheltering component 46 facing the multiple light guide plate 20', so as to increase light sheltering effect of the light sheltering component 46. Besides, the present invention can further dispose a glue layer 50 on the surface of the light sheltering component 46 facing the multiple light guide plate 20', and adapted to ensure the light sheltering component 46 can be tightly attached to the multiple light guide plate 20'.

Figure 7:
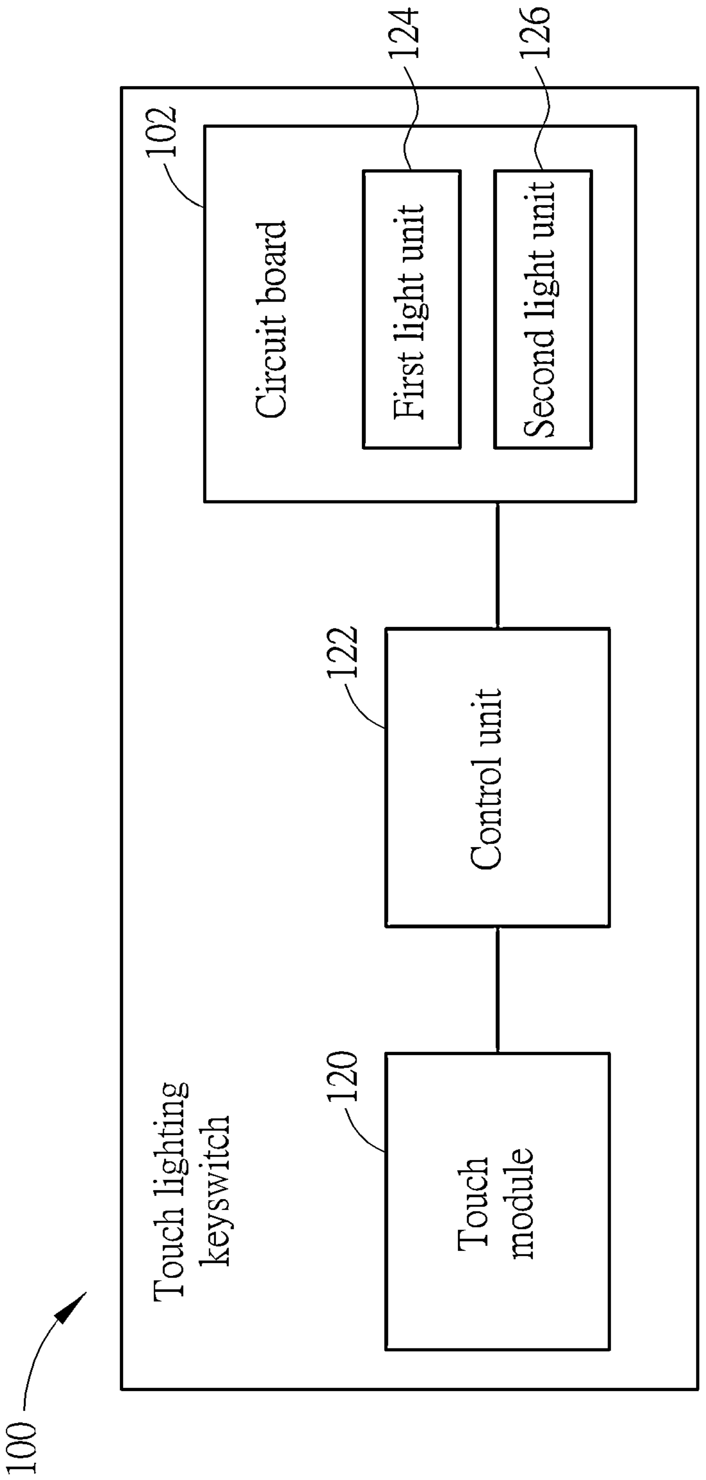
FIG. 7 is a functional block diagram of a touch lighting keyswitch according to the embodiment of the present invention.
Figure 8:
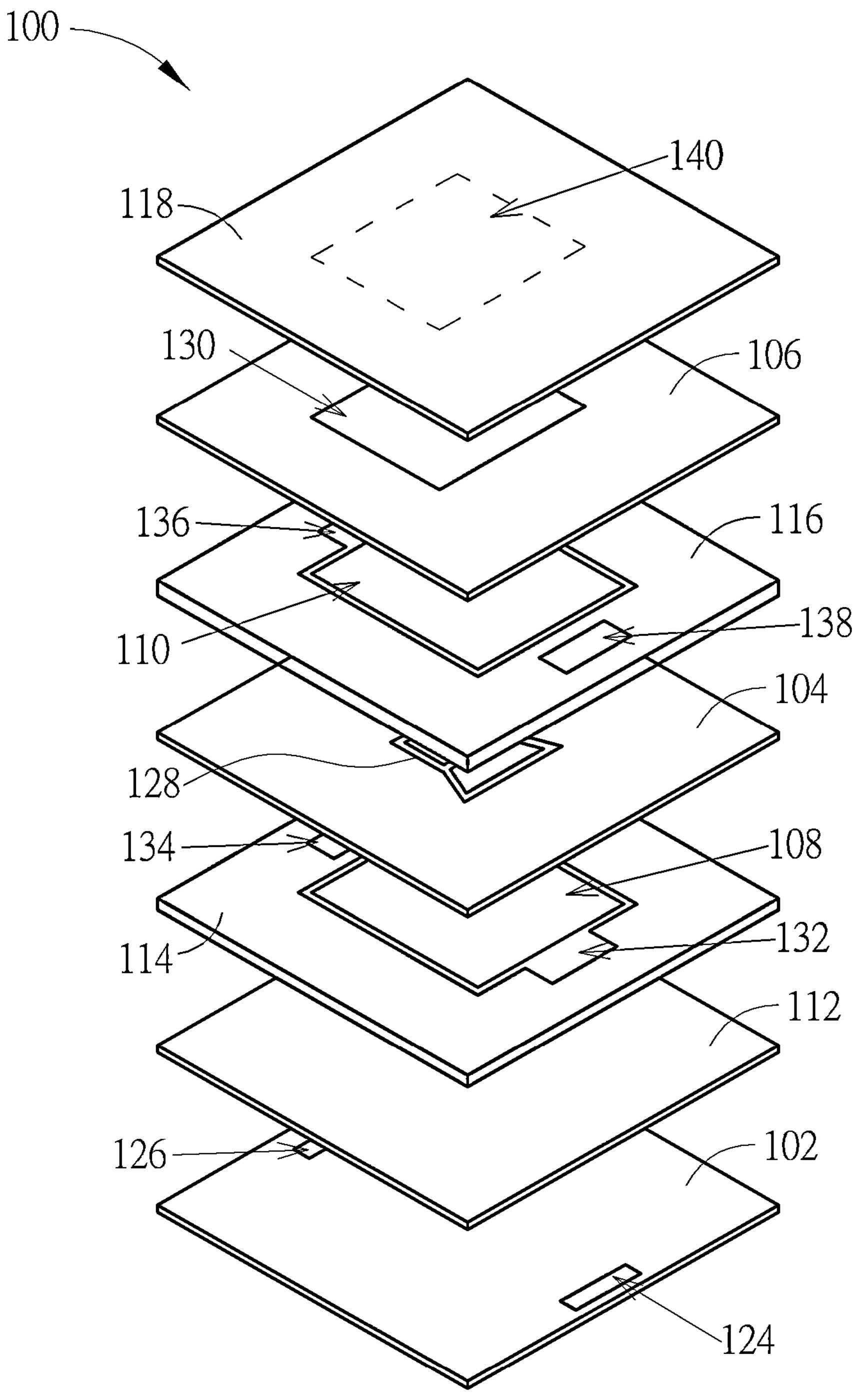
FIG. 8 is an exploded diagram of the touch lighting keyswitch according to the embodiment of the present invention.
Figure 9:
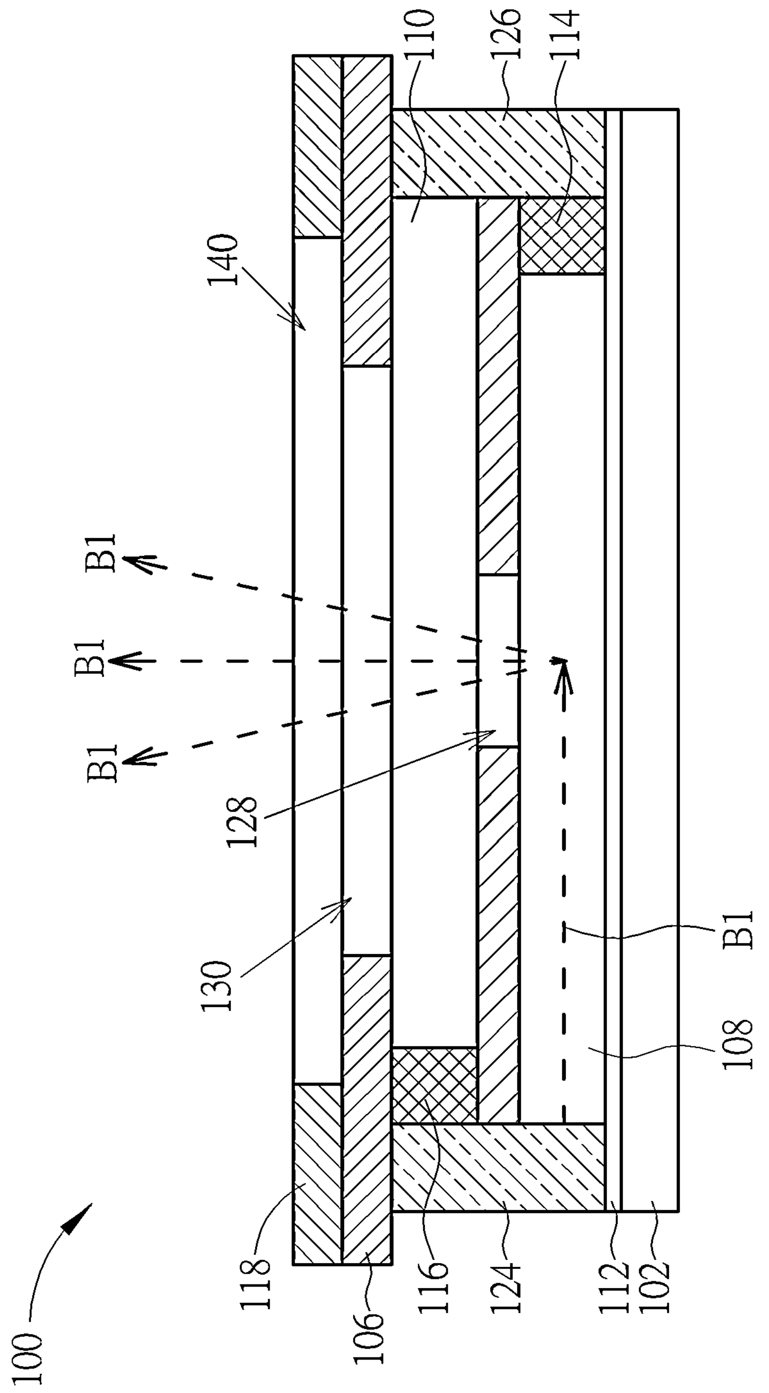
FIG. 9 and FIG. 10 are sectional views of the touch lighting keyswitch in different operation modes according to the embodiment of the present invention.
Figure 10:
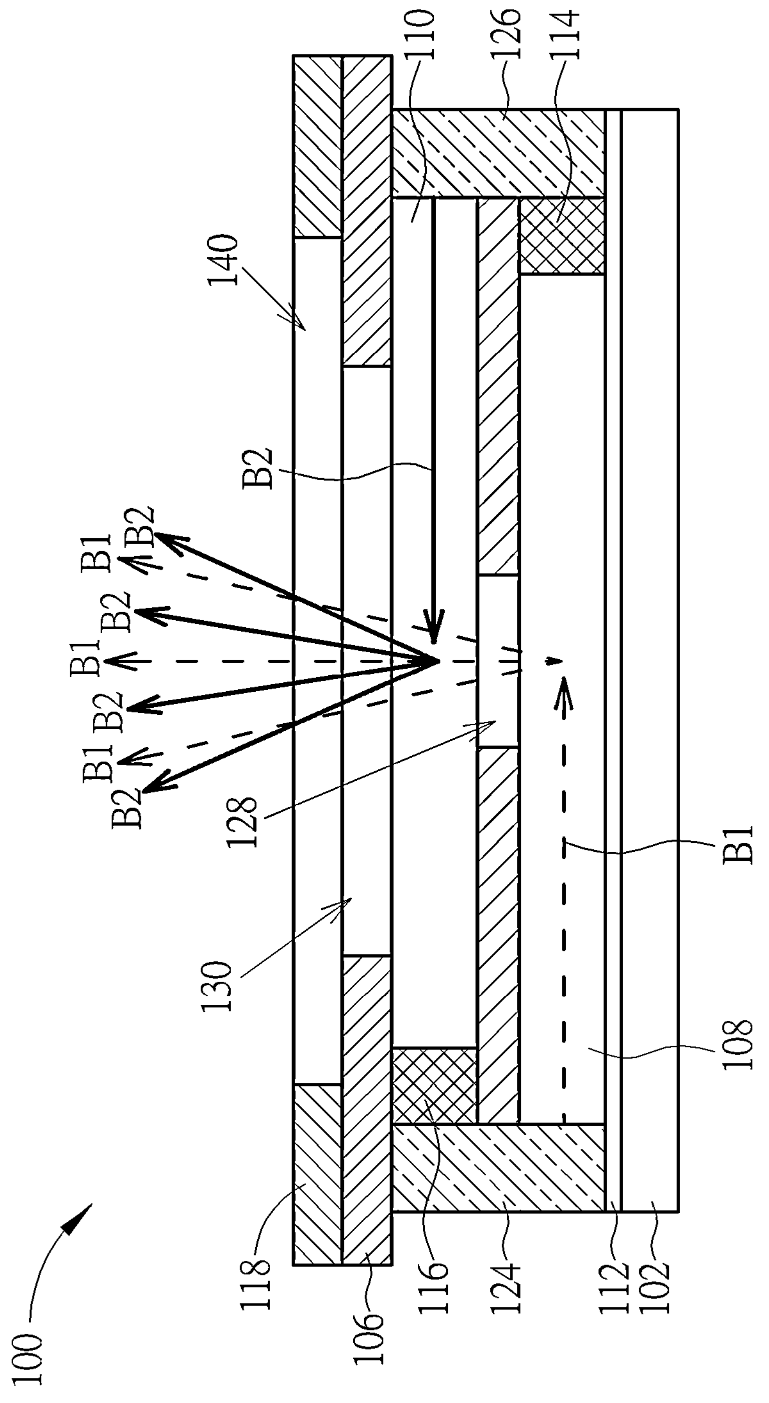

Please refer to FIG. 7 to FIG. 10. FIG. 7 is a functional block diagram of a touch lighting keyswitch 100 according to the embodiment of the present invention. FIG. 8 is an exploded diagram of the touch lighting keyswitch 100 according to the embodiment of the present invention. FIG. 9 and FIG. 10 are sectional views of the touch lighting keyswitch 100 in different operation modes according to the embodiment of the present invention. The touch lighting keyswitch 100 can optionally include a circuit board 102, a first sheltering component 104, a second sheltering component 106, a first light guiding component 108, a second light guiding component 110, a reflection component 112, a first masking component 114, a second masking component 116, a transparent covering component 118, a touch module 120 and a control unit 122. Installation order of the foresaid components can be shown in FIG. 8. The touch module 120 and the control unit 122 can be shown in FIG. 7.

Figure 11:
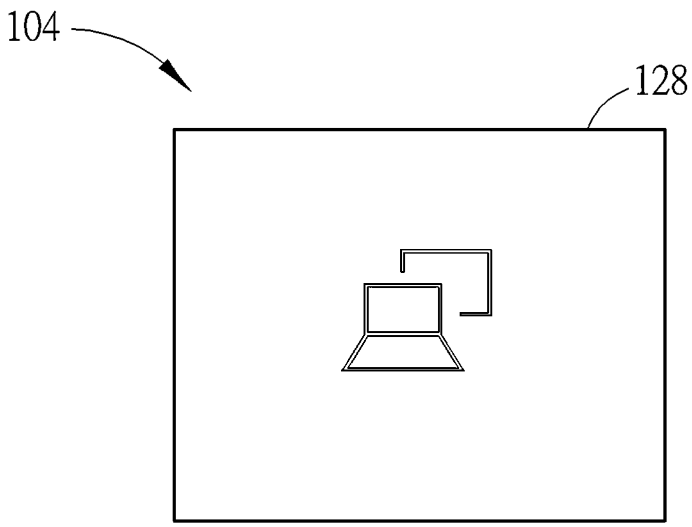
FIG. 11 is a diagram of a first sheltering component according to the embodiment of the present invention.
Figure 12:
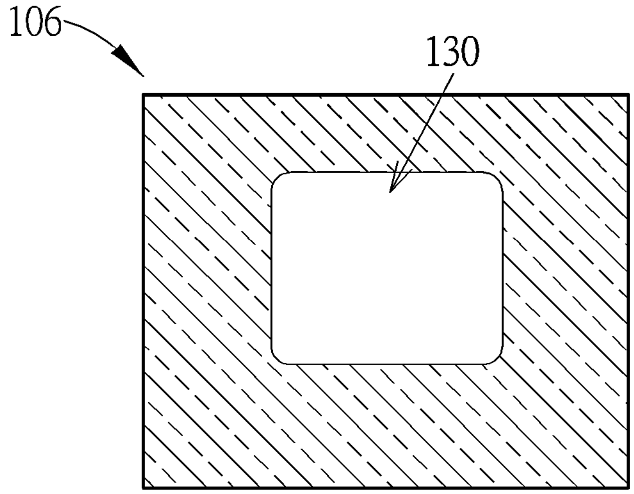
FIG. 12 is a diagram of a second sheltering component according to the embodiment of the present invention.
Figure 13:
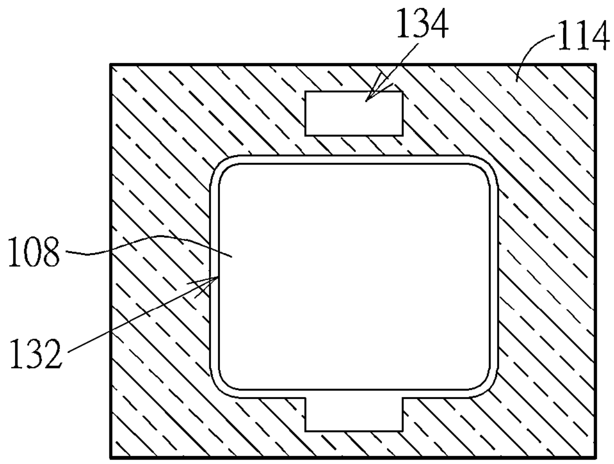
FIG. 13 is a diagram of a first light guiding component and a first masking component according to the embodiment of the present invention.
Figure 14:
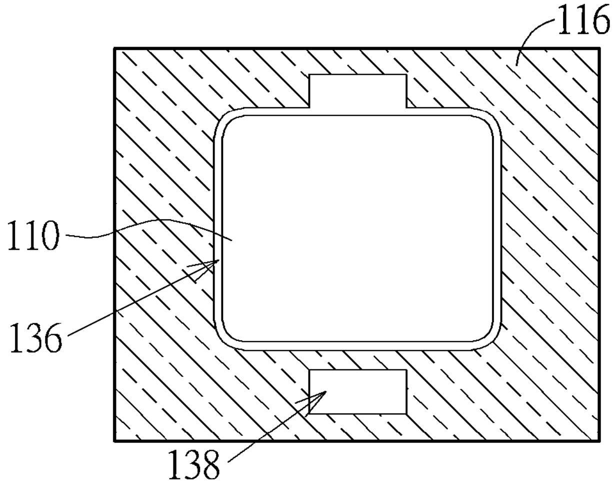
FIG. 14 is a diagram of a second light guiding component and a second masking component according to the embodiment of the present invention.

Please refer to FIG. 11 to FIG. 14. FIG. 11 is a diagram of the first sheltering component 104 according to the embodiment of the present invention. FIG. 12 is a diagram of the second sheltering component 106 according to the embodiment of the present invention. FIG. 13 is a diagram of the first light guiding component 108 and the first masking component 114 according to the embodiment of the present invention. FIG. 14 is a diagram of the second light guiding component 110 and the second masking component 116 according to the embodiment of the present invention. The circuit board 102 can include a first light unit 124 and a second light unit 126. The first light unit 124 can emit a first illumination beam B1. The second light unit 126 can emit a second illumination beam B2 having color different from color of the first illumination beam B1. For example, the first illumination beam B1 can be white light, and the second illumination beam B2 can be green light; colors of the first illumination beam B1 and the second light unit 126 can depend on the design demand. The first illumination beam B1 can be a light source of the touch lighting keyswitch 100 in a standby mode. The second illumination beam B2 can be a light source that provides visual feedback when the touch lighting keyswitch 100 is actuated.

The first sheltering component 104 can be disposed above the circuit board 102, and have a character hole 128. Position of the character hole 128 can be preferably located on a center area of the first sheltering component 104. A type of the character hole 128 can depend on position of the touch lighting keyswitch 100 on a keyboard; and the foresaid type can be a pattern of battery, or a pattern of speaker, or a character of Fn. The first light guiding component 108 can be disposed between the circuit board 102 and the first sheltering component 104, and used to guide the first illumination beam B1 passing through the character hole 128, as shown in FIG. 9. The second sheltering component 106 can be located above the first sheltering component 104, and have an opening 130 corresponding to the character hole 128. The opening 130 can be designed in various types, such as a round opening or a polygonal opening or an irregular opening. An opening 130 that is located above the character hole 128 and have a size greater than a maximal outline of the character hole 128 to illuminate the character hole 128 and its surrounding area by the second illumination beam B2 can belong to a design scope of the present invention. The second light guiding component 110 can be disposed between the second sheltering component 106 and the first sheltering component 104, and used to guide the second illumination beam B2 transmitting towards the opening 130 when the first illumination beam B1 passes through the character hole 128 and the opening 130, which means the touch lighting keyswitch 100 can simultaneously provide colors of the first illumination beam B1 and the second illumination beam B2 when the touch lighting keyswitch 100 is actuated, as shown in FIG. 10.

In addition, the first masking component 114 can include a first hollow area 132 and a first sidestep area 134 spaced from each other. The second light unit 126 can be inserted into the first sidestep area 134. The first light guiding component 108 can be disposed inside the first hollow area 132. The first light unit 124 can be inserted into the first hollow area 132 and disposed adjacent to the first light guiding component 108. As shown in FIG. 13, the first masking component 114 can be located between the second light unit 126 and the first light guiding component 108. The first illumination beam B1 emitted by the first light unit 124 can be transmitted towards the first sheltering component 104 through the first light guiding component 108 that is located inside the first hollow area 132. The second illumination beam B2 emitted by the second light unit 126 can be sheltered by the first sidestep area 134 and cannot enter the first light guiding component 108.

Accordingly, the second masking component 116 can include a second hollow area 136 and a second sidestep area 138 spaced from each other. The first light unit 124 can be inserted into the first second sidestep area 138. The second light guiding component 110 can be disposed inside the second hollow area 136. The second light unit 126 can be inserted into the second hollow area 136 and disposed adjacent to the second light guiding component 110. As shown in FIG. 14, the second masking component 116 can be located between the first light unit 124 and the second light guiding component 110. The second illumination beam B2 emitted by the second light unit 126 can be transmitted towards the second sheltering component 106 through the second light guiding component 110 that is located inside the second hollow area 136. The first illumination beam B1 emitted by the first light unit 124 can be sheltered by the second sidestep area 138 and cannot enter the second light guiding component 110.

Besides, the transparent covering component 118 can be disposed above the second sheltering component 106, and have a touch region 140 that corresponds to the character hole 128 and the opening 130. The transparent covering component 118 can cover electronic components and optical components inside the touch lighting keyswitch 100 for waterproof and dustproof protection. The touch region 140 can be defined as the center area of the transparent covering component 118, which depends on the actual demand. The reflection component 112 can be optionally disposed between the circuit board 102 and the first light guiding component 108, and used to increase an illumination intensity of the touch lighting keyswitch 100. In other possible embodiment of the present invention, the reflection layer (which is not marked in the figures) may be disposed on the upper surface of the circuit board 102 to set as the reflection component 112, which also increases the illumination intensity of the touch lighting keyswitch 100.

Furthermore, the control unit 122 can be electrically connected to the first light unit 124 and the second light unit 126 of the circuit board 102. The touch module 120 can be electrically connected to the control unit 122 and disposed adjacent to the transparent covering component 118. As shown in FIG. 9, when the touch lighting keyswitch 100 is in the standby mode without being actuated, the control unit 122 can drive the first light unit 124 to emit the first illumination beam B1, and the first illumination beam B1 can be guided by the first light guiding component 108 to pass through the character hole 128 of the first sheltering component 104, the second light guiding component 110, the opening 130 of the second sheltering component 106, and the transparent covering component 118; the character hole 128 of the touch lighting keyswitch 100 can show color of the first illumination beam B1, and the second light unit 126 does not emit the second illumination beam B2.

When the touch region 140 of the touch lighting keyswitch 100 is pressed, the touch module 120 can output a related touch signal, and the control unit 122 can further drive the second light unit 126 to emit the second illumination beam B2. The second illumination beam B2 can be guided by the second light guiding component 110 to pass through the opening 130 of the second sheltering component 106, and the transparent covering component 118; the touch lighting keyswitch 100 can simultaneously show colors of the first illumination beam B1 and the second illumination beam B2. For example, the outline of the character hole 128 may show the color of the first illumination beam B1, and the outline of the opening 130 may show the color of the second illumination beam B2, as shown in FIG. 10.

Figure 15:
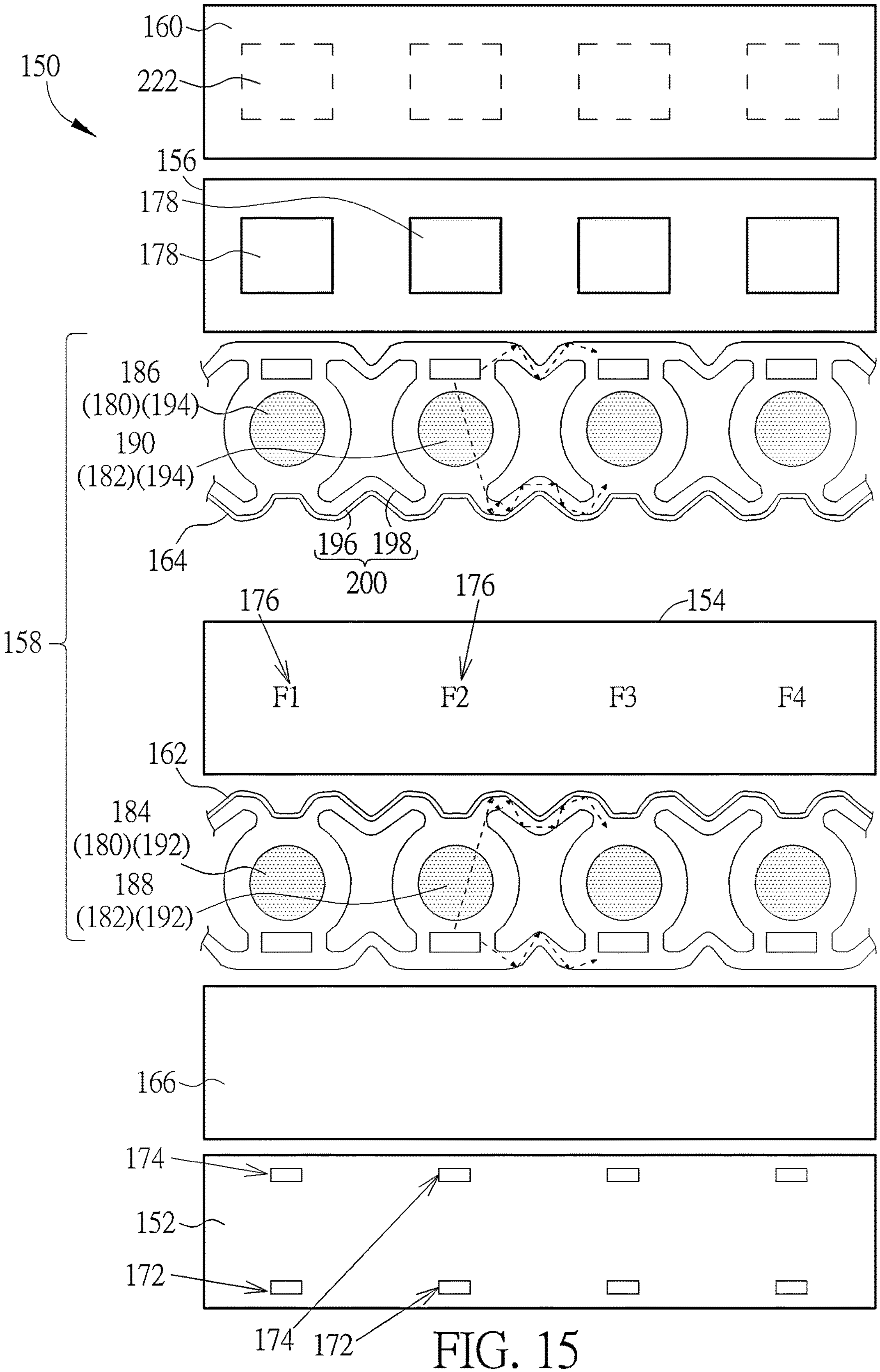
FIG. 15 is a diagram of a touch lighting function key bar according to the embodiment of the present invention.
Figure 16:
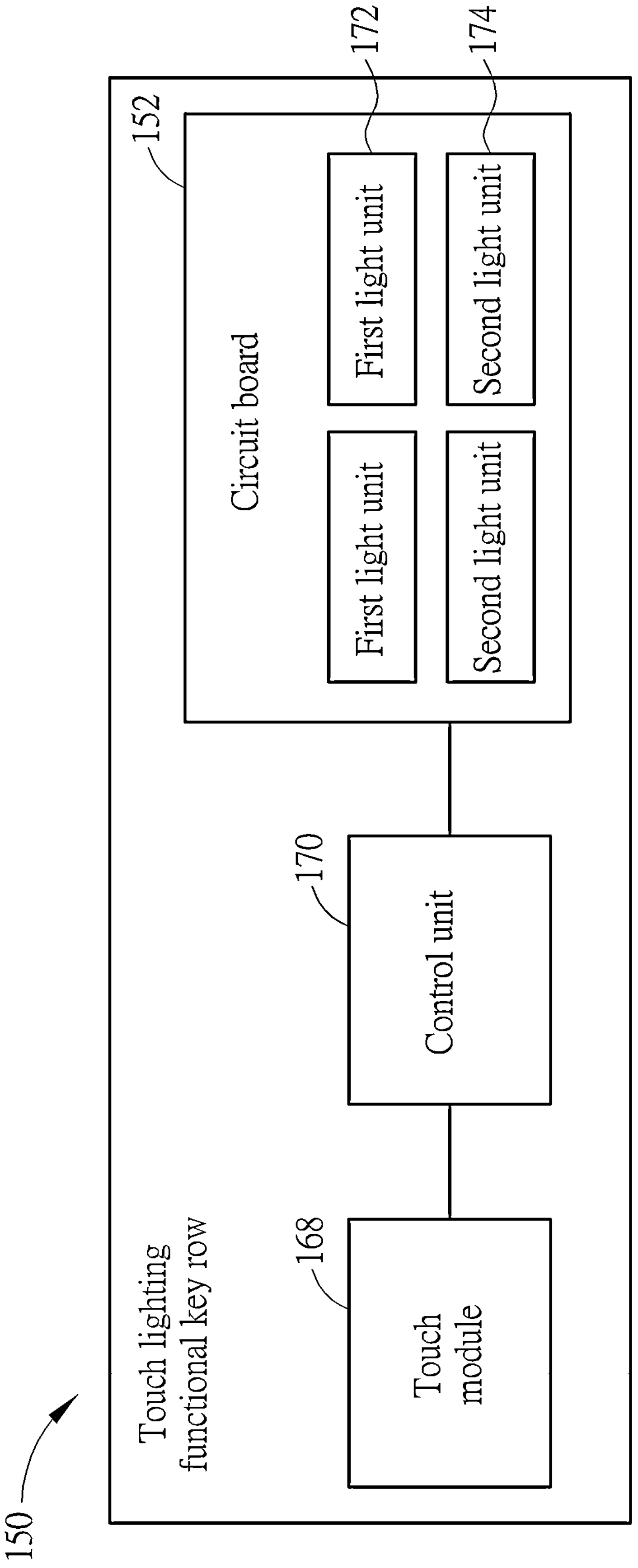
FIG. 16 is a functional block diagram of the touch lighting function key bar according to the embodiment of the present invention.

Please refer to FIG. 15 and FIG. 16. FIG. 15 is a diagram of a touch lighting function key bar 150 according to the embodiment of the present invention. FIG. 16 is a functional block diagram of the touch lighting function key bar 150 according to the embodiment of the present invention. The touch lighting function key bar 150 can be a row composed of several function keys. The touch lighting function key bar 150 can include a circuit board 152, a first sheltering component 154, a second sheltering component 156, a light guide assembly 158, a transparent covering component 160, a first masking component 162, a second masking component 164, a reflection component 166, a touch module 168 and a control unit 170. The circuit board 152 can include a plurality of first light units 172 and a plurality of second light units 174. Each of the first light unit 172 can emit the first illumination beam. Each of the second light units 172 can emit the second illumination beam having the color different from the color of the first illumination beam. For example, the first illumination beam and the second illumination beam can respectively be the white light and the green light, which depends on the actual demand. In the embodiment, each of the first light units 172 can be paired with one corresponding second light unit 174. An interval between one pair of light units (which includes the first light unit 172 and the corresponding second light unit 174) and another pair of light units can set in accordance with the functional demand of the touch lighting function key bar 150. The first sheltering component 154 can be located above the circuit board 152, and have a plurality of character holes 176. Position of the plurality of character holes 176 can correspond to position of the pairs of light units. The second sheltering component 156 can be located above the first sheltering component 154, and have a plurality of openings 178 respectively corresponding to the character holes 176. Numbers of the character hole 176 and the opening 178 can depend on a number of the first light unit 172 or the second light unit 174.

The light guide assembly 158 can include a plurality of light guide bodies, such as a first light guide body 180 and a second light guide body 182. In the embodiment, the light guide assembly 158 may include other light guide bodies, but an example of the first light guide body 180 and the second light guide body 182 is only explained in the following description. A number of the light guide bodies can correspond to numbers of the character hole 176 or the opening 178. The first light guide body 180 can include a first lower light guide unit 184 and a first upper light guide unit 186. The first lower light guide unit 184 can be disposed between the first sheltering component 154 and the circuit board 152, and used to guide the first illumination beam emitted by the first light unit 172 passing through the corresponding character hole 176 (such as the character F1). The first upper light guide unit 186 can be disposed between the second sheltering component 156 and the first sheltering component 154, and used to guide the second illumination beam emitted by the second light unit 174 transmitting towards the corresponding opening 178 (such as the opening 178 relevant to the character F1) when the first illumination beam emitted by the first light unit 172 passes through the character hole 176 (such as the character F1). The second light guide body 182 can be disposed adjacent to and spaced from the first light guide body 180, and include a second lower light guide unit 188 and a second upper light guide unit 190. The second lower light guide unit 188 can be disposed between the first sheltering component 154 and the circuit board 152, and used to guide the first illumination beam emitted by the first light unit 172 passing through the corresponding character hole 176 (such as the character F2). The second upper light guide unit 190 can be disposed between the second sheltering component 156 and the first sheltering component 154, and used to guide the second illumination beam emitted by the second light unit 174 transmitting towards the corresponding opening 178 (such as the opening 178 relevant to the character F2) when the first illumination beam emitted by the first light unit 172 passes through the character hole 176 (such as the character F2).

As shown in FIG. 15, the light guide plate can be formed by the first light guide body 180 and the adjacent second light guide body 182 that are connected with each other in a spaced manner. For example, the first lower light guide unit 184 and the second lower light guide unit 188 are monolithically integrated with each other to form a first light guiding component 192. The first upper light guide unit 186 and the second upper light guide unit 190 are monolithically integrated with each other to form a second light guiding component 194. In the possible embodiment of the present invention, the first light guiding component 192 can include several bridging portions 200, and each bridging portion 200 includes a first section 196 and a second section 198 bent from each other. Each bridging portion 200 can be disposed between the first light guide body 180 and the second light guide body 182 that are disposed adjacent to each other. The first section 196 of each bridging portion 200 can be connected between the first lower light guide unit 184 and the second section 198, and the second section 198 of each bridging portion 200 can be connected between the second lower light guide unit 188 and the first section 196. Accordingly, the second light guiding component 194 can have the same bridging portions, and the detailed description is omitted herein for simplicity.

The first masking component 162 can cover an outer edge of the first light guiding component 192, and be located between the second light unit 174 and the first light guiding component 192. The second masking component 164 can cover an outer edge of the second light guiding component 194, and be located between the first light unit 172 and the second light guiding component 194. In the embodiment, the first masking component 162 may be only disposed on an edge of the first light guiding component 192 close to the second light unit 174, and the second masking component 164 may be only disposed on an edge of the second light guiding component 194 close to the first light unit 172; practical application of position of the masking components is not limited to the foresaid embodiment. For example, the first light guiding component 192 may be fully covered by the first masking component 162; any first masking component 162 that is disposed between the first light guiding component 192 and the second light unit 174 and does not block the first illumination beam emitted by the first light unit 172 from entering the first light guiding component 192 can belong to the design scope of the present invention. The second masking component 164 can have the same design scope, and the detailed description is omitted herein for simplicity.

The transparent covering component 160 can be disposed on the second sheltering component 156, and have a plurality of touch regions 202 respectively corresponding to the character holes 176. The transparent covering component 160 can be touched by the user to actuate the related function key of the touch lighting function key bar 150. The reflection component 166 can be optionally disposed on the circuit board 152; as the above-mentioned embodiment, the touch lighting function key bar 150 may dispose the reflection layer (which is not marked in the figures) on the upper surface of the circuit board 152 to set as the reflection component 166, and variation of the reflection layer can depend on the design demand. The control unit 170 can be electrically connected with the first light unit 172 and the second light unit 174 of the circuit board 152. The touch module 168 can be electrically connected with the control unit 170 and disposed adjacent to the transparent covering component 160.

When the touch lighting function key bar 150 is not actuated, the control unit 170 can drive the first light units 172 of all the function keys to emit the first illumination beam, and the first illumination beam can be guided by the first light guiding component 192 to pass through the character hole 176 of the first sheltering component 154; the function keys on the touch lighting function key bar 150 can respectively correspond to the character holes 176 with different types, and all the character holes 176 can show color of the first illumination beam. When one or some function keys of the touch lighting function key bar 150 is pressed (which means one or some touch regions 202 of the transparent covering component 160 is actuated), the touch module 168 can output the related touch signal, and the control unit 170 can drive the second light unit 174 corresponding to the actuated function key to emit the second illumination beam. The second illumination beam can be guided by the second light guiding component 194 to pass through the corresponding opening 178 of the second sheltering component 156, and therefore the actuated function key can simultaneously show colors of the first illumination beam and the second illumination beam.

In conclusion, the backlight module of the present invention can design the multiple light guide plate including the light guide bodies and the bridging portions. The light guide bodies are disposed adjacent to and spaced from each other. The bridging portion can be connected between the adjacent light guide bodies so that the multiple light guide plate can be assembled easily. The light guide body can be designed as the rectangular structure, the diamond structure, the round structure or the polygonal structure. The bridging portion can be designed as the C-type structure, the S-type structure, the W-type structure, the M-type structure, or any structure with a concave and convex form. The bridging portion can include sections bent from each other, and the bridging portion can be connected to the light guide body in the bending manner. Therefore, the multiple light guide plate can dispose the roundabout bridging portion between the adjacent light guide bodies, and a width of the bridging portion can be ranged between 0.1 mm and 2 mm. The bridging portion can effectively increase the absorption and reflection times of the light beam in transmission so as to prevent the light beam from being transmitted to other light guide body, and to achieve the design demand of no light leakage. Besides, the present invention can further stack the sheltering components and the light guide plates within the touch lighting keyswitch, and dispose the light units that correspond to the numbers of the sheltering component and the light guide plate in the touch lighting keyswitch, so that the touch lighting keyswitch can provide a backlight function in the standby mode, and further can provide another illumination function different from the backlight function when being pressed and actuated, so as to generate an illumination interaction effect. Accordingly, the multiple light guide plate of the present invention can be applied to the touch lighting function key bar, and all the function keys of the touch lighting function key bar in the standby mode can provide the backlight function, and some of the function keys may be actuated to generate the illumination function different from the backlight function, which can increase design texture of the touch lighting keyswitch and the related illuminated keyboard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch lighting keyswitch comprising:

a circuit board, a first light source and a second light source being disposed on the circuit board, the first light source emitting a first illumination beam, the second light source emitting a second illumination beam having a color different from a color of the first illumination beam;

a first shelter having a character hole;

a first light guide disposed between the circuit board and the first shelter, and adapted to guide the first illumination beam passing through the character hole;

a second shelter disposed above the first shelter, and having an opening located above and aligned with the character hole; and a second light guide disposed between the second shelter and the first shelter, and adapted to guide the second illumination beam transmitting towards the opening when the first illumination beam passes through the character hole and the opening.

2. The touch lighting keyswitch of claim 1, wherein the opening is a round opening or a polygonal opening located above the character hole, a size of the opening is greater than a maximal outline of the character hole.

3. The touch lighting keyswitch of claim 1, further comprising:

a reflector disposed between the circuit board and the first light guide.

4. The touch lighting keyswitch of claim 1, wherein the circuit board comprises a reflection layer.

5. The touch lighting keyswitch of claim 1, further comprising:

a controller electrically connected to the circuit board, and configured to actuate the second light source to emit the second illumination beam only when the first light source is actuated to emit the first illumination beam and a touch signal is received.

6. The touch lighting keyswitch of claim 5, further comprising:

a transparent cover disposed above the second shelter, and having a touch region located above and aligned with the character hole; and a touch sensing circuit electrically connected to the controller and disposed adjacent to the transparent cover, and adapted to output the touch signal when the touch region is actuated.

7. The touch lighting keyswitch of claim 1, further comprising:

a first mask disposed between the second light source and the first light guide; and a second mask disposed between the first light source and the second light guide.

8. The touch lighting keyswitch of claim 7, wherein the first mask comprises a first hollow area and a first sidestep area distant from each other, the second light source is inserted into the first sidestep area, the first light guide is disposed inside the first hollow area, and the first light source is inserted into the first hollow area and disposed adjacent to the first light guide.

9. The touch lighting keyswitch of claim 7, wherein the second mask comprises a second hollow area and a second sidestep area distant from each other, the first light source is inserted into the second sidestep area, the second light guide is disposed inside the second hollow area, and the second light source is inserted into the second hollow area and disposed adjacent to the second light guide.

10. A touch lighting function key bar, comprising:

a circuit board, at least two first light sources and at least two second light sources being disposed on the circuit board, each of the at least two first light sources emitting a first illumination beam, each of the at least two second light sources emitting a second illumination beam having a color different from a color of the first illumination beam, one first light source of the at least two first light sources being paired with a corresponding second light source of the at least two second light sources;

a first shelter having at least two character holes;

a second shelter disposed above the first shelter, and having at least two openings located above and aligned with the character holes;

a light guide assembly, comprising:

a first light guide body comprising a first lower light guide and a first upper light guide unit, the first lower light guide being disposed between the first shelter and the circuit board and adapted to guide the first illumination beam emitted by the one first light source passing through one of the character holes, the first upper light guide being disposed between the second shelter and the first shelter and adapted to guide the second illumination beam emitted by the corresponding second light source passing through one of the openings when the one first light source emits the first illumination beam; and a second light guide body disposed adjacent to and spaced from the first light guide body, the second light guide body comprising a second lower light guide unit and a second upper light guide, the second lower light guide being disposed between the first shelter and the circuit board and adapted to guide the first illumination beam emitted by another first light source of the at least two first light sources passing through another character hole of the character holes, the second upper light guide being disposed between the second shelter and the first shelter and adapted to guide the second illumination beam emitted by another second light source of the at least two second light sources passing through another opening of the openings when the another first light source emits the first illumination beam.

11. The touch lighting function key bar of claim 10, wherein each of the openings is a round opening or a polygonal opening located above a corresponding character hole of the character holes, a size of each opening is greater than a maximal outline of the corresponding character hole.

12. The touch lighting function key bar of claim 10, further comprising:

a reflector disposed on the circuit board.

13. The touch lighting function key bar of claim 10, wherein the circuit board comprises a reflection layer.

14. The touch lighting function key bar of claim 10, wherein the first lower light guide and the second lower light guide are formed as a first light guide the first upper light guide and the second upper light guide are formed as a second light guide.

15. The touch lighting function key bar of claim 14, wherein the first light guide comprises a bridging portion with a first section and a second section bent from each other, the first section is connected between the first lower light guide and the second section, the second section is connected between the second lower light guide and the first section.

16. The touch lighting function key bar of claim 14, further comprising:

a first mask disposed among the second light source and the first light guide; and a second mask disposed among the first light source and the second light guide.

17. The touch lighting function key bar of claim 10, further comprising:

a controller electrically connected to the circuit board, and adapted to actuate a second light source of the at least two second light sources corresponding to a touch signal to emit the second illumination beam when the at least two first light sources are actuated to emit the first illumination beam and the touch signal is received.

18. The touch lighting function key bar of claim 17, further comprising:

a transparent cover disposed above the second shelter, and having at least two touch regions located above and aligned with the character holes; and a touch sensing circuit electrically connected to the controller and disposed adjacent to the transparent cover, and adapted to output the touch signal when one of the touch regions is actuated so as to emit the second illumination beam by the second light source located under the actuated touch region.

19. The touch lighting function key bar of claim 16, wherein the first light guide is covered by the first mask.

20. The touch lighting function key bar of claim 16, wherein the second light guide is covered by the second mask.

* * * * *